(12) United States Patent
Jain et al.

(10) Patent No.: US 6,709,328 B1
(45) Date of Patent: Mar. 23, 2004

(54) VENTILATION SYSTEM FOR A BUS

(75) Inventors: Sunil K. Jain, Fort Wayne, IN (US); Aaron D. Lindsey, Bryant, IN (US); Kenneth J. Smith, Yoder, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/420,289

(22) Filed: Apr. 22, 2003

(51) Int. Cl.$^7$ .................................................. B60H 1/00
(52) U.S. Cl. ........................... 454/144; 454/83; 454/108
(58) Field of Search ........................... 454/83, 108, 112, 454/120, 144

(56) References Cited

U.S. PATENT DOCUMENTS

| | | | | |
|---|---|---|---|---|
| 3,688,680 A | * | 9/1972 | Lambert | ..................... 454/301 |
| 4,118,062 A | * | 10/1978 | Harder et al. | .................. 296/63 |
| 4,201,064 A | | 5/1980 | Krug et al. | |
| 4,413,550 A | | 11/1983 | Piano | |
| 5,307,645 A | * | 5/1994 | Pannell | ......................... 62/244 |
| 5,518,448 A | * | 5/1996 | Madoglio et al. | ........... 454/108 |
| 5,902,181 A | * | 5/1999 | Bain | ........................... 454/144 |
| 5,984,774 A | * | 11/1999 | Upham, III | .................. 454/144 |
| 6,068,046 A | | 5/2000 | Pommier et al. | |
| 6,565,035 B1 | * | 5/2003 | Kim et al. | ................... 244/1 R |

\* cited by examiner

*Primary Examiner*—Derek Boles
(74) *Attorney, Agent, or Firm*—Jeffrey P. Calfa; Dennis Kelly Sullivan; Susan L. Lukasik

(57) ABSTRACT

Heating, ventilation and air conditioning systems for busses achieve improved air distribution by the use of ducts to distribute the air throughout the passenger compartment. The ducts have a varying cross sectional area so that the impedance to air flow appears constant at all points along the duct. The quantity of air distributed from each of a plurality of vents is substantially even is effectively equalized.

7 Claims, 6 Drawing Sheets

VENTILATION SYSTEM FOR A BUS

BACKGROUND OF THE INVENTION

1. Field of the Invention

The present invention relates to ventilation systems for busses, and, more particularly, to a duct system for delivering heated and air conditioned air evenly to all of the seating areas in a bus.

2. Description of the Problem

Busses, particularly school busses, have often been equipped with primitive heating, ventilation and air conditioning systems. Typically free air systems have been used which result in highly uneven temperatures through the vehicle's passenger compartment. In some applications overhead ducts have been used which provide better air distribution, but this results in reduced head room. Aircraft type high pressure systems have also been employed in busses with good results, but these can entail such expense as to be difficult to justify for school busses.

Under floor duct and vent systems have been proposed for smaller vehicles such as vans and cars as disclosed in U.S. Pat. Nos. 4,413,550 to Piano and 6,068,046 to Pommier et al. These systems do not however deal with the extensive lengths encountered in constructing a duct system for a bus fed from one or more air treatment units.

SUMMARY OF THE INVENTION

According to the invention there is provided an air distribution mechanism for a bus comprising an air blower and ducts connected to the air blower which extend along the interior side of the body side walls of the bus for transporting the air from the blower to various parts of the bus. Distributed along the length of the body side ducts and mutually spaced from one another are a plurality of underseat ducts connected to and extending from the body side ducts into the interior of the vehicle. Vents release air from the underseat ducts into the passenger compartment of the vehicle. The body side ducts expand in cross sectional area as distance from point of the connection each body side duct with the air blower increases. Reducing resistance to air flow in the primary air channel as a function of distance from the air blower results in the amount of air released from each vent being about the same.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
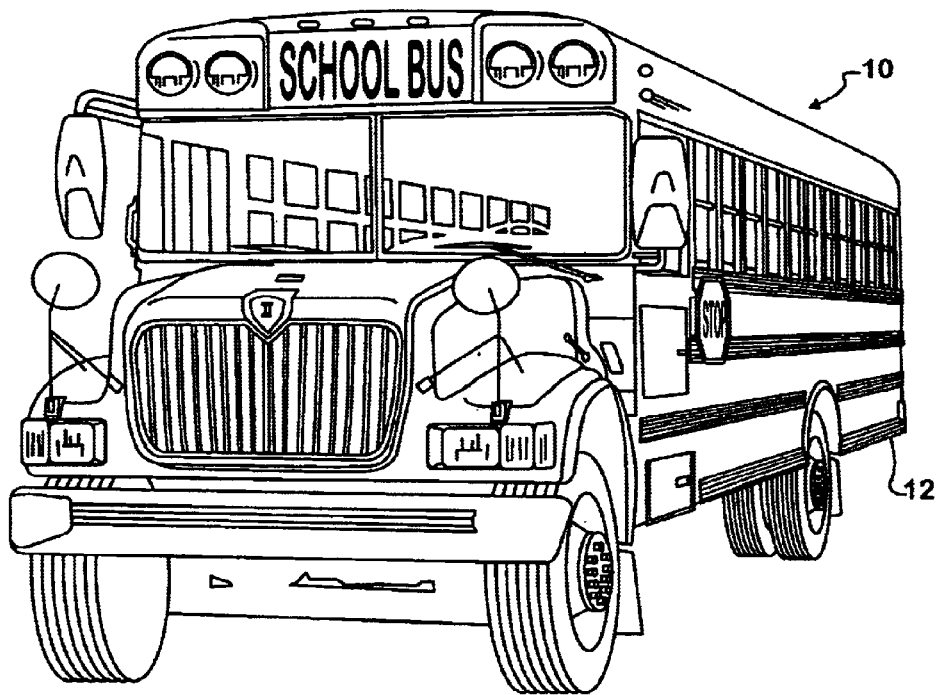
FIG. 1 is a perspective view of a school bus of a type with which the invention is advantageously employed.
Figure 2:
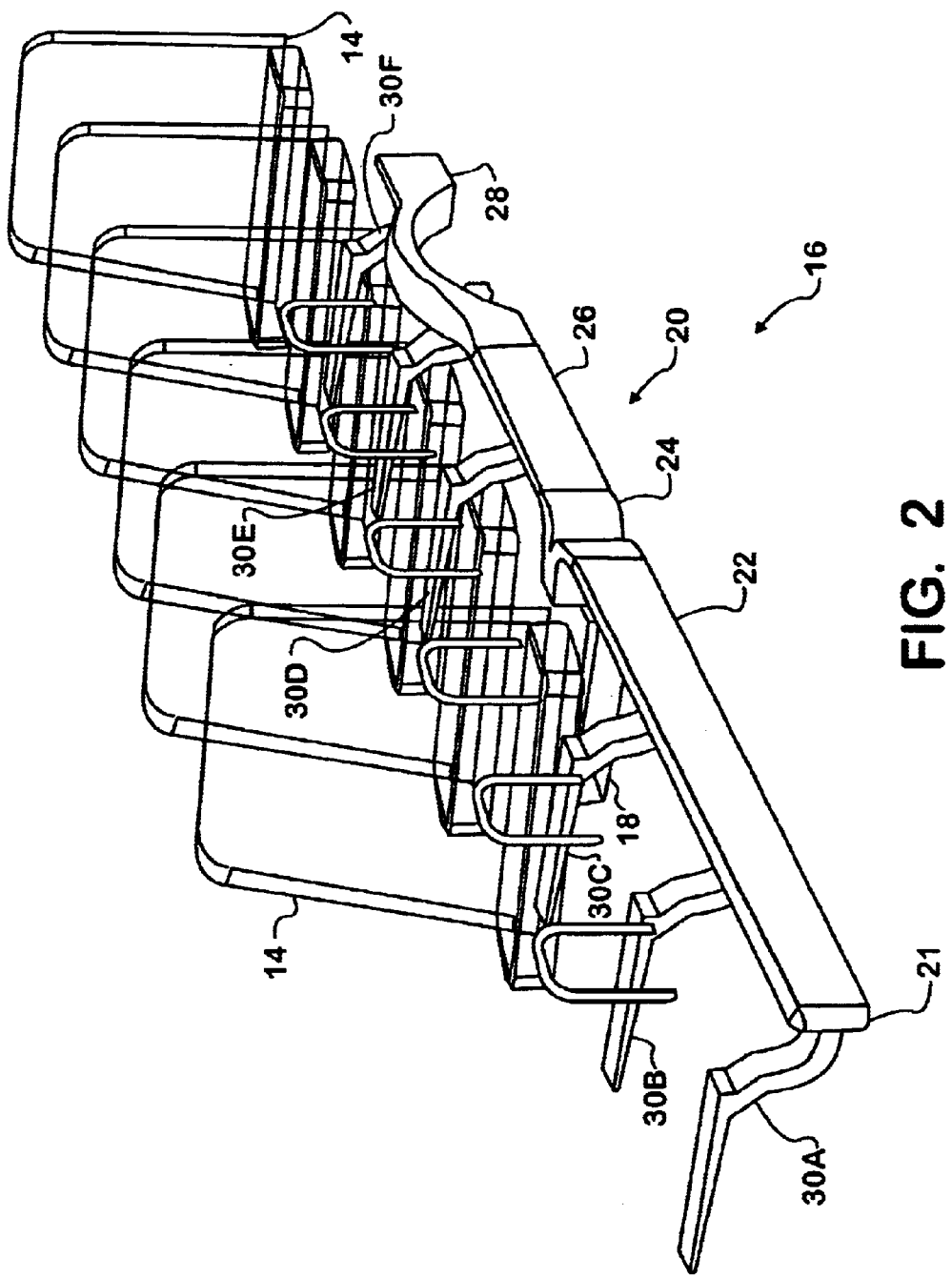
FIG. 2 is a perspective view of a ventilation system in accordance with the invention for installation on a bus of the type illustrated in FIG. 1.

Referring now to the figures, FIG. 1 shows a school bus 10 having an elongated body 12 enclosing a passenger compartment. As illustrated in FIG. 2, the passenger compartment has a plurality of bench seats 14 which typically are arranged in rows, facing forward and running substantially the length of the compartment. Bench seats 14 are oriented transverse to the direction of elongation of the passenger compartment. The invention provides for the distribution of air from the air treatment and blower unit 18 of a heating, ventilation and air conditioning system 16 through a duct system including a body side duct 20. While the duct system for only one side of the vehicle is illustrated a second duct system, modified as required to accommodate doors and the like, is provided for the second side of the vehicle.

Figure 4:
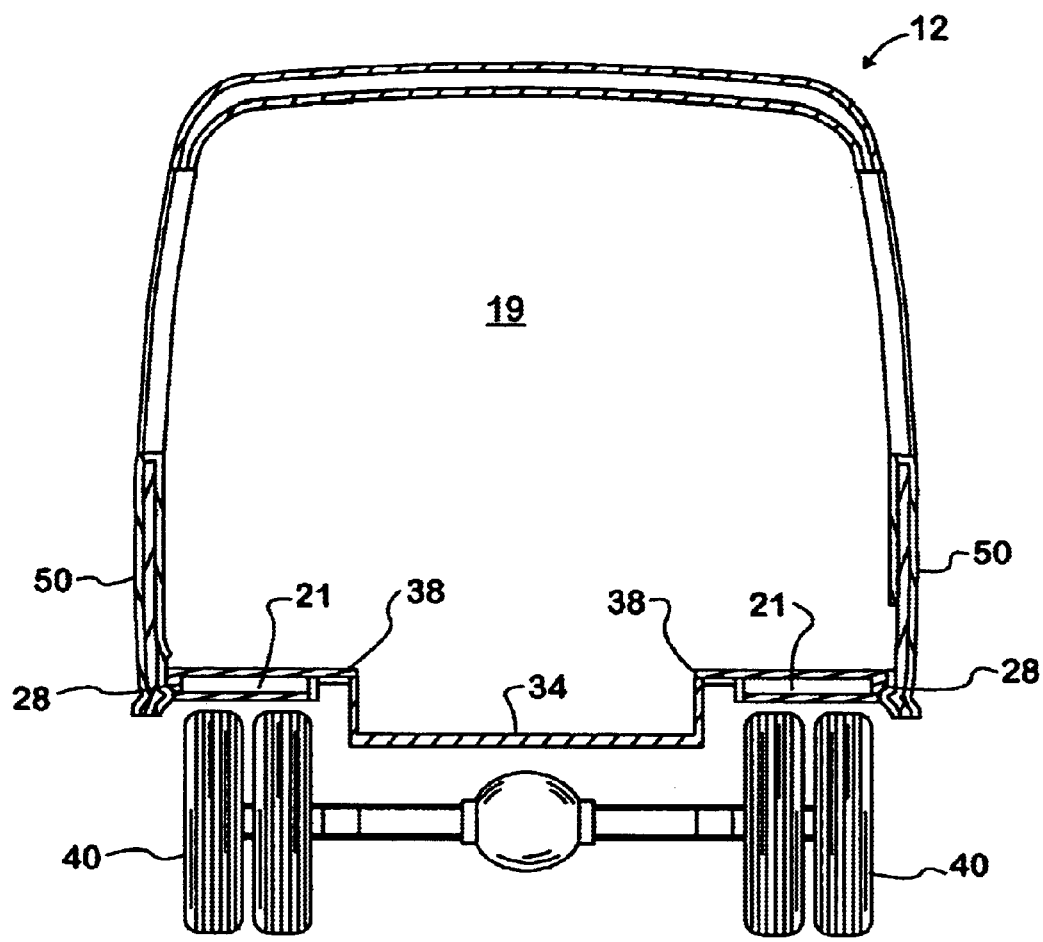
FIG. 4 is a cross sectional view of a bus illustrating location of body side ducts of a ventilation system with respect to wheel wells.
Figure 5:
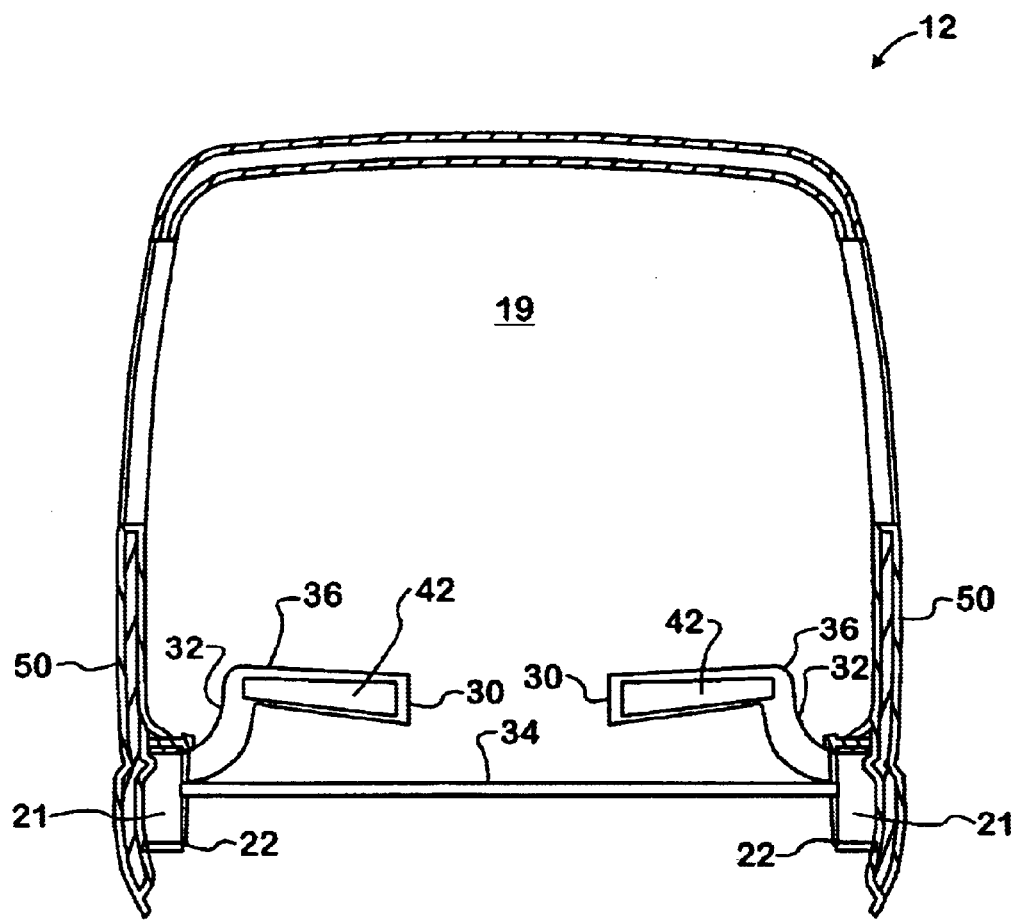
FIG. 5 is a cross sectional view of a bus illustrating connection of underseat ducts to body side ducts.

Body side duct 20 runs along a side of elongated body 12 at approximately the height of a floor to the passenger compartment (shown in FIGS. 4 and 5). Body side duct 20 comprises four sections in the preferred embodiment. Here an air treatment and blower unit 18 is located under the floor and centrally with respect to the horizontal extent of the passenger compartment. A transition duct section 24 is located centrally along the side of the vehicle connected directly to air treatment and blower unit 18. Transition duct section 24 is a Y junction, dividing the flow into two streams, one to be directed into forward duct section 22, which runs toward the front part of the vehicle, and the second directed into the rear duct section 26, which carries air to the rear portion of the passenger compartment. A wheel well duct section 28 connects to the rear duct section distal from its point of attachment to the transition duct section 24. Wheel well duct section 28 comprises a subsection flattened relative to the vertical and formed into a semicircle to accommodate the vehicle's wheels.

To promote the even distribution of air through the ducts, body side duct 20, in each of its component sections, is characterized by an increasing cross sectional area of the flow channel 21 defined by the component sections as distance from the air treatment and blower unit 18 increases. The increasing cross sectional area of flow channel 21 results in reduced impedance to flow through the channel at each junction of the body side duct 20 with an underseat duct 30. The same quantity of air should escape from the vents from each underseat duct 30. Dimensions of the ducting may be increased in the vertical, horizontal or a combination of both directions. Adjustment in the dimensions of the venting may be stepped or gradual.

Figure 3:
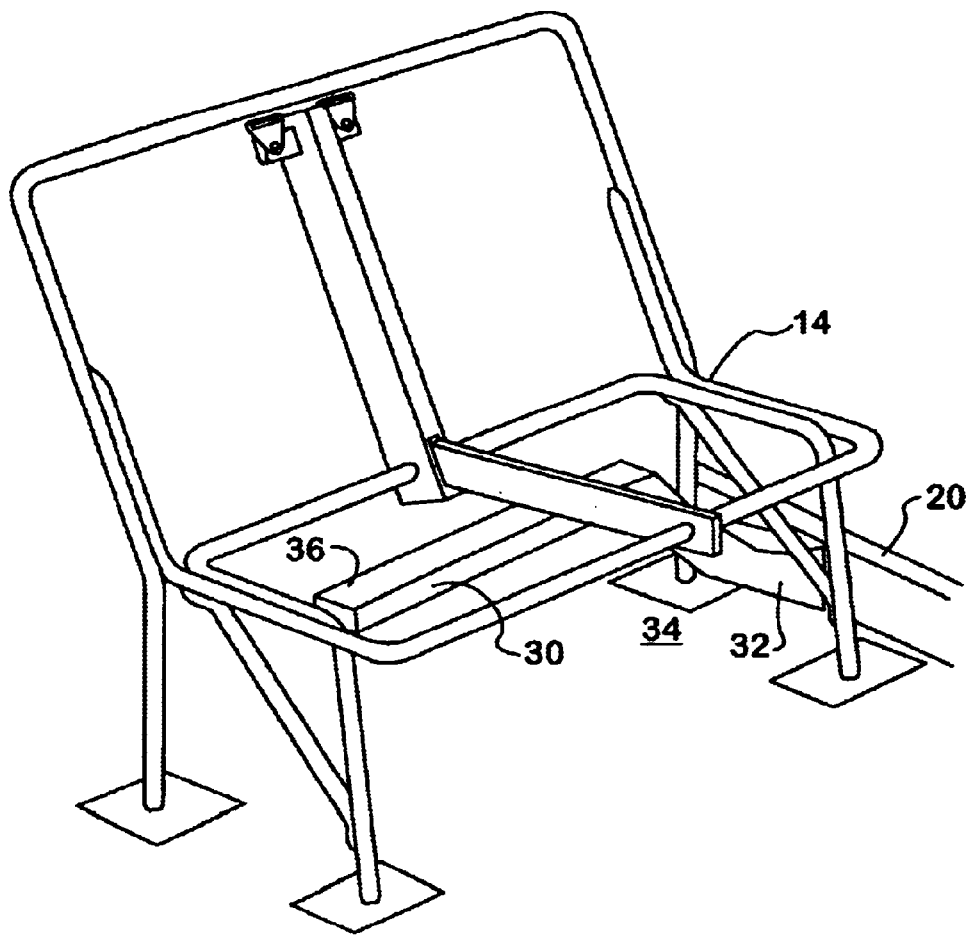
FIG. 3 is a perspective view of a bench seat illustrating positioning of an underseat duct of the ventilation system.

Air is released from the ducting system through vents from a plurality of underseat ducts 30A-F. FIG. 3 better illustrates one underseat duct 30, which attaches at one end to body side duct 20 and terminates at point distal to the body side duct inside the passenger compartment but under bench seat 14 (from which cushions have been removed to improve illustration of the underseat duct). Underseat ducts 30 are oriented perpendicular to body side duct 20 and include a riser section 32 which attaches to duct 20 at a point just above the floor 34 and extends upwardly to a point just under the bottom of the seat of bench seat 14. An underseat section 36 extends along the bottom of seat 14 from the upper end of riser section 32 toward the longitudinal center line of the vehicle, before terminating at a point still under the seat. Vents 42 (illustrated in FIG. 5) direct air outward behind seat 14. Vents 42 are illustrated as comprising a single outlet, however, they may be divided into two or more outlets, corresponding to the number of intended occupants of the trailing bench, and each outlet fitted with an independently directable nozzle.

FIGS. 4 and 5 are cross sectional views taken at different points along the length of elongated body 12, looking forward from the rear of the vehicle from the wheel wells 38 in FIG. 4 and taken at a point along the forward duct section 22 in FIG. 5. Duct sections 22 and 28 are positioned snug against the interior face of body side walls 50 of elongated body 12. Duct sections 22 and 28 are embedded into floor 34, although in other embodiments they may be located entirely under the floor, over the floor, form a portion of the floor, or be partly under the floor. In the area of wheel wells 38 duct section 28 is flattened in the vertical direction and spreads in the horizontal direction as it bends around the well. In this way wheels 40 are accommodated without loss of cross-sectional areas.

In FIG. 5 the projection of underseat ducts 30 into passenger compartment 19 is again illustrated. Vents 42 in underseat sections 36 release forced air into passenger compartment 19, with each vent having approximately equal flow.

Figure 6:
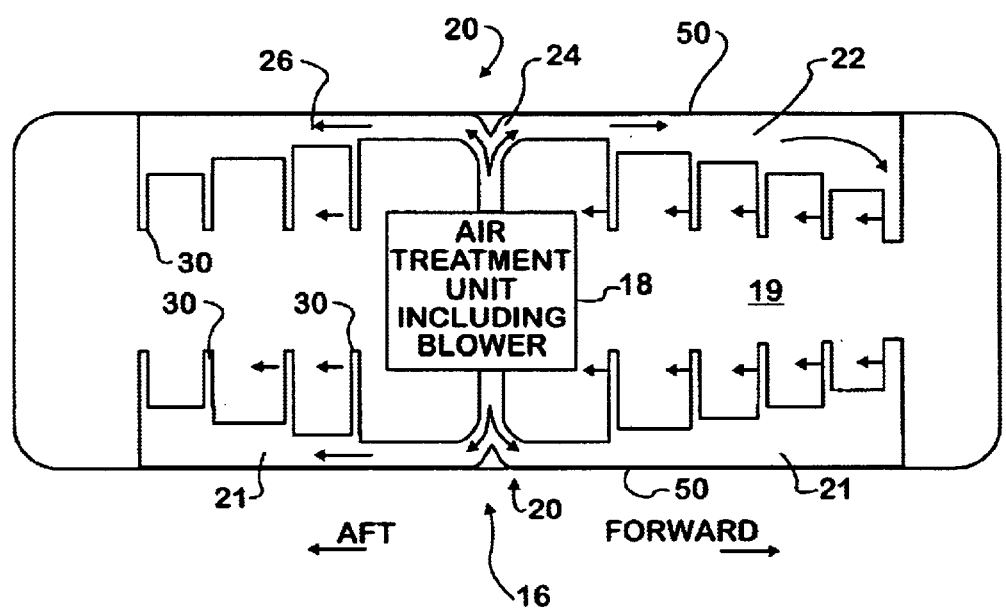
FIG. 6 is a schematic view of the ventilation system in accord with a preferred embodiment.

Referring now to FIG. 6, a schematic view of ventilation system 16 illustrates the centered position of air treatment and blower unit 18 and the flow of air (indicated by arrows) out of unit 18 into transition duct 24, through the transition duct to the forward and rear body side duct sections 22 and 26 to the underseat ducts 30 and finally escape from the underseat ducts into the vehicle passenger compartment 19. Downstream along flow channel 21 from the junction of each underseat duct 30 with body side duct 20, body side duct 20 widens to control the amount of air which will pass into each underseat duct. Underseat ducts 30 are stepped up in terms of cross-sectional area as a function of the distance of the underseat ducts' junction with body side duct 20 from blower 18. More than one air treatment and blower unit 18 may be provided, each typically being used for a different zone of the vehicle.

The invention provides a cost advantageous system for achieving even distribution of air through a bus by use of ducts exhibiting reduced air flow resistance with distance from a blower.

While the invention is shown in only one of its forms, it is not thus limited but is susceptible to various changes and modifications without departing from the spirit and scope of the invention.

What is claimed is:

1. A ventilation system for a vehicle comprising:

an air treatment unit including a blower;

a body side duct positioned along an interior side of the vehicle for a substantial length of a passenger compartment and connected to receive forced air from the blower, the body side duct being characterized by an increasing cross sectional area as a function of distance from the connection to the air treatment unit;

a plurality of underseat ducts extending into the passenger compartment from body side duct, the underseat ducts being mutually spaced along the length of the body side duct and having outlet vents into the passenger compartment; and a vent from each underseat duct.

2. A ventilation system as set forth in claim 1, wherein the vents from the plurality of underseat ducts each release a substantially equal quantity of air.

3. A ventilation system as set forth in claim 2, further comprising the underseat ducts being located under each of a plurality of forward facing bench seats positioned in the passenger compartment of the vehicle with the vents being directed toward the rear of the vehicle.

4. A ventilation system as set forth in claim 3, wherein the vehicle is a school bus.

5. A motor vehicle comprising:

an elongated passenger compartment defined in part by body side walls and a floor;

a plurality of benches installed on the floor transverse to the direction of elongation of the elongated passenger compartment;

a forced air blower installed on the vehicle;

body side ducts installed along the body side walls and connected to the forced air blower, the body side ducts expanding in cross sectional area with increasing distance from the connection to the forced air blower; and underseat ducts extending from one or the other of the body side ducts into the passenger compartment under the benches.

6. A motor vehicle as set forth in claim 5, further comprising:

the underseat ducts having expanded in cross sectional areas with increasing distance from the connection of the underseat ducts to a body side duct.

7. A motor vehicle as set forth in claim 6, further comprising vents from the underseat ducts aimed aft.

* * * * *